(12) United States Patent
Kenney et al.

(10) Patent No.: US 7,272,155 B2
(45) Date of Patent: Sep. 18, 2007

(54) CENTRAL POLICY MANAGER

(75) Inventors: Anthony Kenney, Weston, MA (US); Manickam R. Sridhar, Holliston, MA (US); Vladimir Sukonnik, Dover, MA (US)

(73) Assignee: Converged Access, Inc., Littleton, MA (US)

( * ) Notice: Subject to any disclaimer, the term of this patent is extended or adjusted under 35 U.S.C. 154(b) by 975 days.

(21) Appl. No.: 09/950,979

(22) Filed: Sep. 12, 2001

(65) Prior Publication Data

US 2002/0122422 A1   Sep. 5, 2002

Related U.S. Application Data

(60) Provisional application No. 60/231,680, filed on Sep. 11, 2000.

(51) Int. Cl.
*H04J 3/16* (2006.01)

(52) U.S. Cl. ........................ 370/469; 370/235

(58) Field of Classification Search .............. None
See application file for complete search history.

(56) References Cited

U.S. PATENT DOCUMENTS

| | | | |
|---|---|---|---|
| 6,104,700 A | | 8/2000 | Haddock et al. |
| 6,185,210 B1 | | 2/2001 | Troxel |
| 6,286,052 B1 | | 9/2001 | McCloghrie et al. |
| 6,466,984 B1 * | 10/2002 | Naveh et al. ............... 709/228 |
| 6,681,232 B1 * | 1/2004 | Sistanizadeh et al. ..... 707/104.1 |
| 6,775,280 B1 * | 8/2004 | Ma et al. ..................... 370/392 |
| 6,842,781 B1 * | 1/2005 | Lavian et al. ............... 709/223 |
| 2003/0195957 A1 * | 10/2003 | Banginwar .................. 709/223 |
| 2004/0031030 A1 * | 2/2004 | Kidder et al. ............... 717/172 |

OTHER PUBLICATIONS

Floyd, S. and Jacobson, V., "Link-sharing and Resource Management Models for Packet Networks", *IEEE/ACM Transactions on Networking*, vol. 3 No. 4, Aug. 1995.
HP Open View PolicyXpert, Primer on Policy-ased Network Management, Oct. 1999 Hewlett-Packard Company.
HP Open View PolicyXpert, Developer's Guide, Oct. 1999 Hewlett.
HP Open View PolicyXpert, User's Guide, Oct. 1999 Hewlett.
IP Highway Open Policy System 1.0, Internet-D Net Reviews, Sep. 1, 2000, pp. 1-4.
Fighting Network Decay, Orchestream, Enterprise Edition 2.0, Sep. 1, 2000.
"The Road to ThruQoS,"1998, IPHighway Inc., Fort Lee, NJ, Sep. 1, 2000.

* cited by examiner

*Primary Examiner*—Duc Ho
(74) *Attorney, Agent, or Firm*—Occhiuti Rohlicek & Tsao LLP

(57) ABSTRACT

A link-sharing classification hierarchy is described, characterizing network traffic at a high level both to allow measurements of network traffic to be aggregated according to classifications in the hierarchy and to describe a policy for network quality of service. Policy templates allow network quality-of-service policies to be re-used across multiple links. Policy alarms can be raised by quality-of-service devices when a policy is violated. An XML API allows applications to manage a central repository of policies.

11 Claims, 11 Drawing Sheets

CENTRAL POLICY MANAGER

This application claims priority under 35 USC §119(e) to U.S. patent application Ser. No. 60/231,680, filed on Sep. 11, 2000, the entire contents of which are hereby incorporated by reference.

TECHNICAL FIELD

This invention relates to computer networking, and more particularly to quality of service controls and remote management from a central device.

BACKGROUND

Simple network management protocol (SNMP) is an open standard for managing network hardware. A management information base (MIB) is a software interface that exposes management data and applications via SNMP.

Quality of service (QoS) includes a range of network management techniques, including both software and hardware, for prioritizing certain traffic flows over others. This is desirable in networks that carry IP (internet protocol) traffic, for instance, since QoS is not an active feature of the current IP standard.

QoS goals can be codified in a network QoS policy, for instance by setting upper and lower bounds on service to network traffic on a link. In times of link congestion, a QoS policy indicates types of traffic that should receive prioritized service, including guaranteed lower bounds on data rates. Upper bounds on data rates can constrain a type of traffic to prevent it from overwhelming other types of traffic, given finite link capacity, for example.

SUMMARY

In general, in one aspect, the invention is a machine-based method for characterizing network traffic at a high level using a classification hierarchy both to allow measurements of network traffic to be aggregated according classifications in the hierarchy and to describe a policy for network quality of service.

In general, in another aspect, the invention is a machine-based method for network quality-of-service policies. The method includes defining a policy using a classification hierarchy for network flows on a link, where the hierarchy includes a root for the link. The hierarchy also includes a group layer containing groups, a class layer containing classes, and a filter layer containing filters. The group layer may be empty and lies wholly above the class layer in the classification hierarchy. The filter layer lies wholly below the class layer. A group can contain child groups or child classes or both. A class in the plurality of classes can contain child classes. Each child group or child class that has a parent in the classification hierarchy represents both a sub-classification of network flows defined on the parent and an allocation of link resources from the parent to the child. The method also includes classifying network traffic both for policy statistics and for performance statistics, using the classification hierarchy.

In general, in yet another aspect, the invention is a machine-based method for network quality-of-service policies, including defining a policy using a classification hierarchy for network flows on a link. The hierarchy includes a root for the link, a group layer containing groups, a class layer containing classes, and a filter layer containing filters, such that the group layer may be empty and lies wholly above the class layer in the classification hierarchy, while the filter layer lies wholly below the class layer. A group in the plurality of groups can contain child groups or child classes or both. A class in the plurality of classes can contain child classes. Each child group or child class that has a parent in the classification hierarchy represents both a sub-classification of network flows defined on the parent and an allocation of link resources from the parent to the child.

Preferred embodiments may include the following features. Defining the policy may further include associating the policy with a schedule describing times when the policy should be enforced. The method may include the additional steps of storing the policy at a first machine, and distributing the policy to a second machine. The second machine may be a quality of service device. The distributing step may further include using a MIB interface to configure the policy on the second machine. The distributing step may further include using a MIB interface to publish the policy on the second machine.

In general, in still another aspect, the invention is a machine-based method for policy templates for network quality-of-service policies, to include defining a policy using a link-sharing classification hierarchy for network flows on a first link and storing the hierarchy for reuse by a second link.

In general, in still yet another aspect, the invention is a machine-based method for network quality-of-service policies, to include detecting a violation of a quality-of-service policy on a network and sending notice of the violation to a network management station.

Preferred embodiments may include the following features. The sending of notice uses an open network standard. The sending of notice uses SNMP. The detecting is performed by a policy agent running as a software process on a quality of service device on the network.

In general, in still a different aspect, the invention is a machine-based method for reporting on network quality-of-service policies, to include classifying a collection of statistical data on network flows according to a link-sharing classification hierarchy defined for a quality-of-service policy. The method also includes reporting the statistical data along with aggregate values compiled from the statistical data using the classifications.

In general, in another different aspect, the invention is a machine-based method for managing network quality-of-service policies, to include providing a central policy manager to manage a quality-of-service policy. The policy is encoded using a link-sharing classification hierarchy. The method also includes exposing an XML interface for applications to manipulate objects in the quality-of-service policy.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
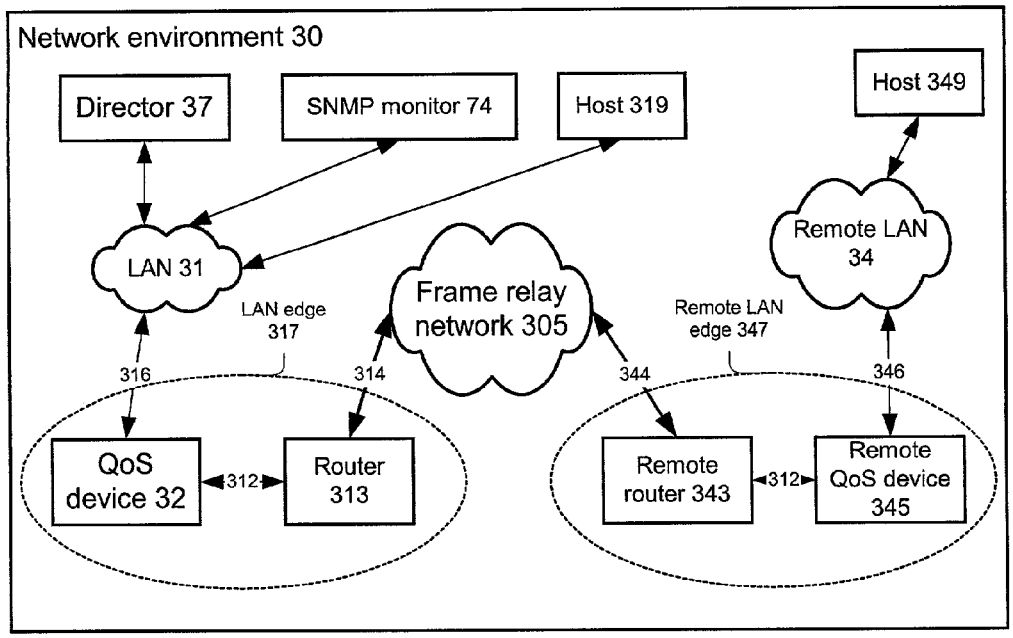
FIG. 1A is a block diagram of quality-of-service devices in a network environment.

In one embodiment, a director device running quality-of-service (QoS) software defines a network QoS policy in terms of a hierarchy, where the hierarchy includes at least a link and a class of network traffic belonging to (i.e., passing over) the link. The hierarchy can further include groups and filters, subject to a precedence ranking such that the decomposition is from a link to groups, to classes, to filters. For each network flow on the link, the hierarchy classifies it to one of the entities within the hierarchy and thus establishes a strict organization of network traffic. In general, the director device defines logical dependencies between different network flows.

A director device distributes QoS policies to QoS devices. The director device also monitors the policies' enforcement by polling the QoS devices. A QoS device includes at least two network interfaces to pass network traffic from one network segment to another. The QoS device runs software to inspect the passing traffic and to enforce the QoS policies on that traffic, as determined by the director device. The QoS device also collects data on the traffic, including performance, policy, and system data. The collection of data uses classifications encoded in a policy definition to classify both performance and policy data. By using the same classifications for both performance and policy data, the QoS device ensures that performance and policy data can be compared without discrepancies due to the accounting methods.

The QoS device exposes MIB interfaces to publish its network traffic data. The director device (or other compliant SNMP device) polls the MIB interfaces repeatedly to discover the QoS device's network traffic data. The QoS device can also analyze the network traffic data to detect noteworthy traffic conditions, including failures, congestion, policy violations, and other noteworthy events and trends. The criteria for what makes the traffic conditions noteworthy are determined by the MIB definitions present on the QoS device and by parameters configurable by the director device. When the QoS device detects that the criteria have been violated, the QoS device can inform the director device via SNMP traps. The traps are asynchronous relative to the director device's polling schedule.

A policy template represents the decomposition of a link into a policy hierarchy. Policy templates allow a policy structure defined on one link to be re-used on other links. A policy template applied to a link defines a policy. A policy in combination with a time schedule and a distribution list (describing devices to which the policy will be distributed) define a policy implementation.

The software running on the director device is modular and intercommunicates via API's. One division within the director devices software divides presentation services from a core central policy manager. The central policy manager manages objects within a central database, including objects that support policy definitions, policy implementations, and other features of the director device. In the director device, presentation services directs how these objects are manipulated. The central policy manager presents an external XML-based API to presentation services. This API exposes a variety of operations on the managed objects, including: object creation, removal, retrieval, and updating; distribution of objects from director device to QoS device; configuration of how event notifications are filtered and processed; and message passing (forwarding) from the management application to UI applications. However, because it is an external API and uses XML, the API can be used by compliant third-party applications instead of (or in addition to) the presentation services module on the director device. In other words, third-party applications can manage policies on the QoS devices by using the XML API.

The software running on the director device includes reporting features. The reports can be scheduled to run automatically, at repeated intervals, or ad-hoc. Reports can be output as files charts, tables, or text files in formats such as CSV. Reports can be output to the filing system or to applications such as email or web servers.

Network Environment and Hardware

With regard to FIG. 1A, QoS device 32 enforces quality-of-service policies at LAN edge 317 in network environment 30. QoS device 32 and director 37 are each connected to LAN 31. Director 37 manages QoS device 32 and monitors the status of QoS device 32 and its quality-of-service policies. Director 37 also manages remote QoS device 345, where remote QoS device 345 is on remote LAN 34.

Network environment 30 includes LAN 31, which connects director 37, QoS device 32, host 319, and SNMP monitor 74. QoS device 32 connects to LAN 31 via local QOS-LAN link 316. LAN edge 317 is a logical region between LAN 31 and frame relay network 305. LAN edge 317 includes QoS device 32 and router 313. All network traffic passing between LAN 31 and frame relay network 305 passes through LAN edge 317. In particular, all network traffic passing between LAN 31 and frame relay network 305 passes through QoS device 32 and router 313. Local QoS-router link 312 is a network link connecting QoS device 32 and router 313. Edge link 314 is a network link connecting router 313 to frame relay network 305.

Network environment 30 also includes remote LAN 34. Remote LAN 34 includes one or more remote hosts 349. Remote LAN 34 connects to remote QoS device 345 via remote QoS-LAN link 346. Remote LAN edge 347 is a logical region between LAN 34 and frame relay network 305. Remote LAN edge 347 includes QoS device 345 and remote router 343. All network traffic passing between LAN 34 and frame relay network 305 passes through remote LAN edge 347. In particular, all network traffic passing between LAN 34 and frame relay network 305 passes through remote QoS device 345 and remote router 343.

Figure 1B:
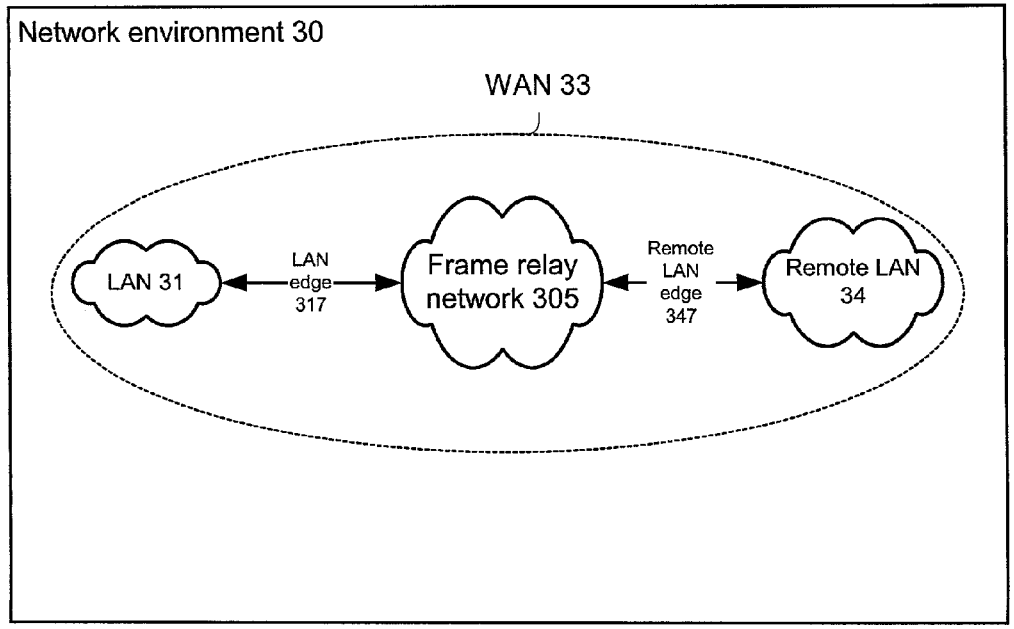
FIG. 1B illustrates a network environment.

As shown in FIG. 1B, WAN 33 includes LAN 31, remote LAN 34, and frame relay network 305.

QoS Device

Figure 2A:
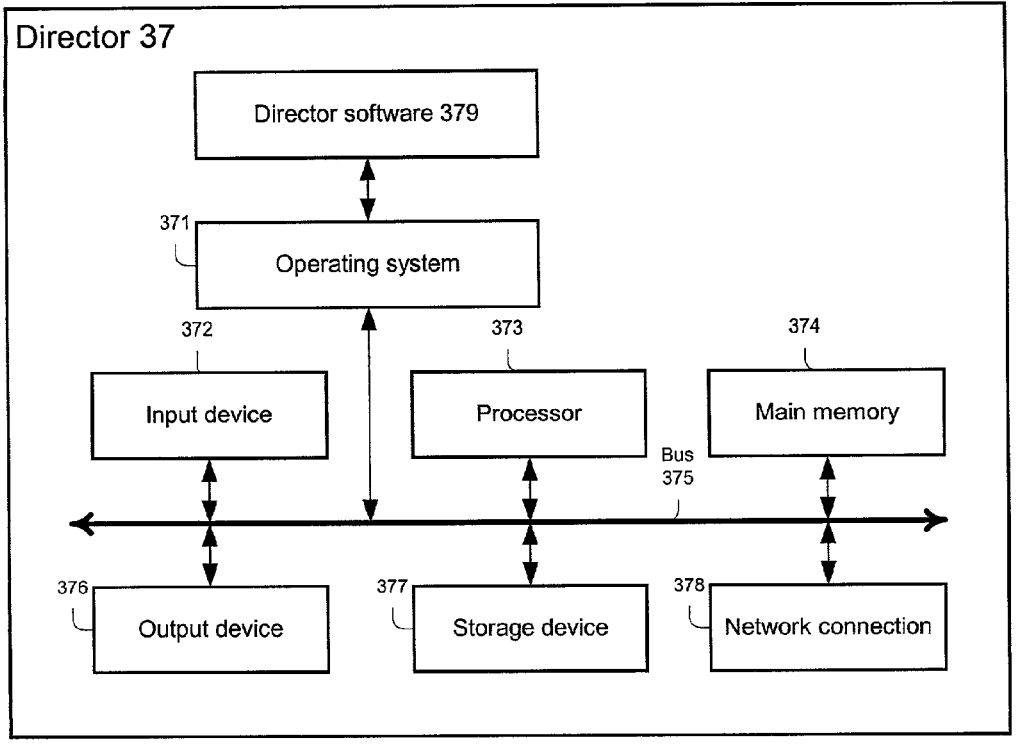
FIG. 2A is a block diagram of components of a director device.
Figure 2B:
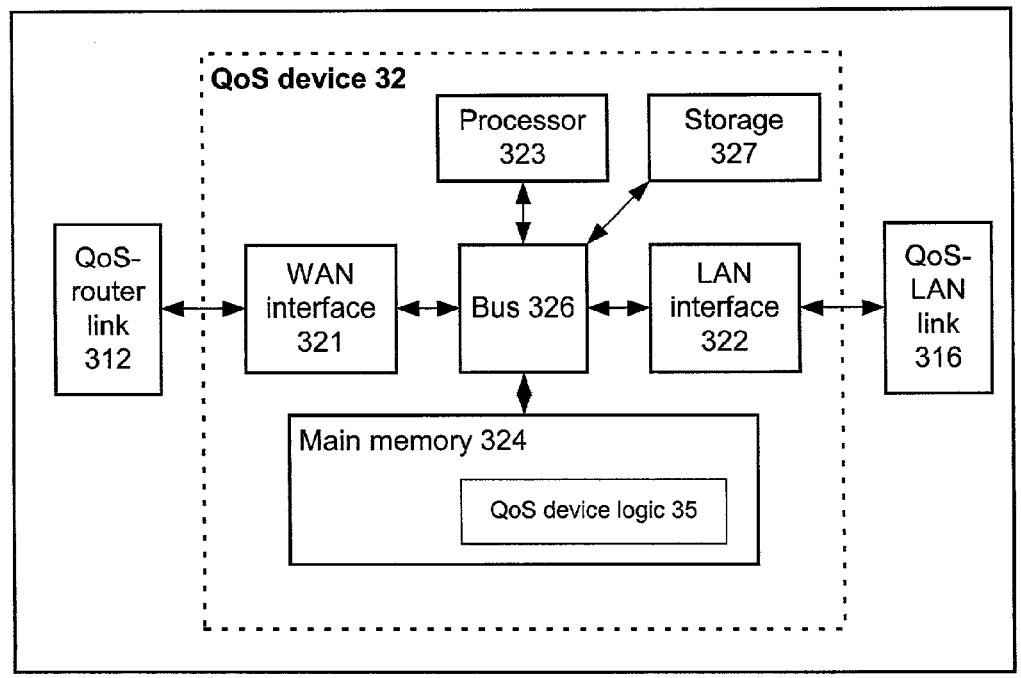
FIG. 2B is a block diagram of a quality-of-service device.

FIG. 2B illustrates components of QoS device 32 and its network links. QoS device 32 includes WAN interface 321, LAN interface 322, processor 323, main memory 324, storage 327, and bus 326. WAN interface 321 is a network interface through which QoS device 32 communicates over QoS-router link 312. LAN interface 322 is a network interface through which QoS device 32 communicates over QoS-LAN link 316. Thus, traffic moving outbound on WAN interface 321 goes toward frame relay network 305, while traffic moving outbound on LAN interface 322 goes toward LAN 31. In this embodiments, WAN interface 321 and LAN interface 322 are Ethernet network interfaces capable of 10/100 Mbps.

QoS device logic 35 includes software code, i.e., machine-readable instructions for performing the functions of QoS device 32. Processor 323 executes these instructions, accessing main memory 324 via bus 326. Bus 326 also connects WAN interface 321, LAN interface 322, and storage 327. Storage 327 is a non-volatile storage device. In this embodiment, storage 327 is a hard disk drive.

Figure 7A:
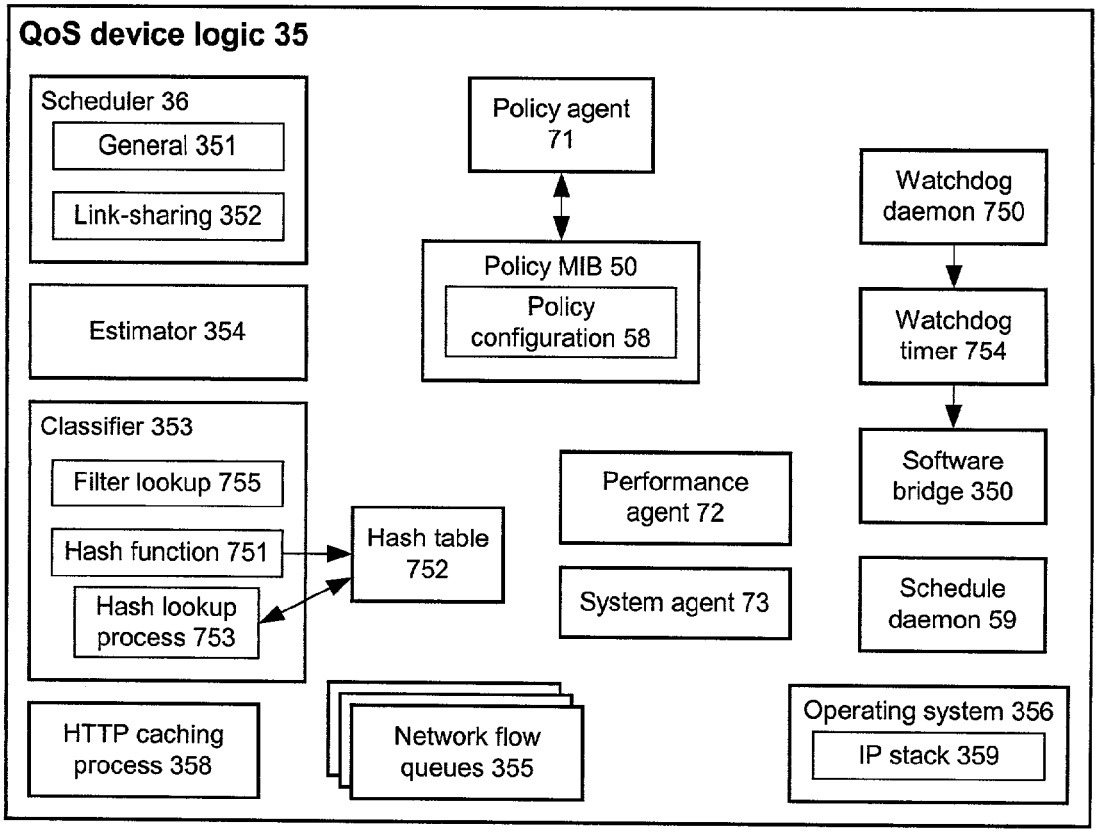
FIG. 7A is a block diagram of QoS device logic components.
Figure 7B:
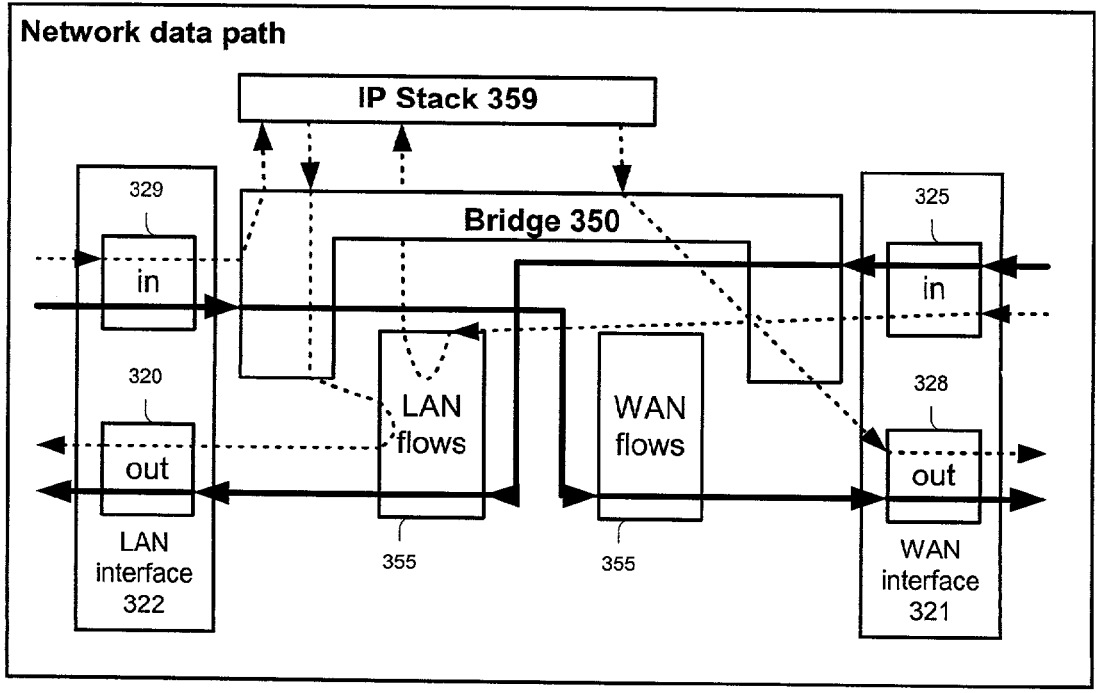
FIG. 7B illustrates a network data path.

With reference to FIG. 7A, QoS device logic 35 includes operating system 356 and a collection of network flow queues 355. In this embodiment, operating system 356 is a Free BSD Unix kernel. The kernel includes modifications so that in the case of a software failure in modules of QoS device logic 35, a fail state of QoS device 32 enables it to act as simply a wire, continuing to pass network traffic despite the software failure.

QoS device 32 maintains network flow queue 355 for each network flow across QoS device 32, as will be explained.

Remote QoS device 345 is physically configured similarly to QoS device 32. Functionally, remote QoS device 345 is equivalent to QoS device 32. Unless stated otherwise, descriptions of the features of QoS device 32 also apply to remote QoS device 345.

A commercially available example of QoS device 32 or remote QoS device 345 is QoSWorks, sold by Sitara Networks, 52 Second Avenue Suite 200, Waltham, Mass. 02451, USA.

Directer

Director 37 is a network management station. Director 37 manages policies 40 and collects management information on network behavior. With regard to FIG. 2A, director 37 includes operating system 371, input device 372, processor 373, main memory 374, bus 375, output device 376, storage device 377, network connection 378, and director software 379.

Operating system 371 is a software process, or set of computer instructions, resident in either main memory 374 or a non-volatile storage device 377 or both. Processor 373 can access main memory 374 and storage device 377 to execute the computer instructions that comprise operating system 371 and director software 379.

A user interacts with the computing platform via input device 372 and output device 376. Possible input devices 372 include a keyboard, a microphone, a touch-sensitive screen, and a pointing device such as a mouse. For simplicity of explanation, "mouse" will refer to any such pointing device. Possible output devices 376 include a display screen, a speaker, and a printer.

Storage device 377 is a computer-writable and computer-readable medium. In this embodiment, storage device 377 is a disk drive. Bus 375 interconnects processor 373, input device 372, output device 376, storage device 377, main memory 374, and network connection 378. Network connection 378 includes a network interface and software to drive it, such as an Ethernet card configured to run TCP/IP and other protocols.

A commercially available example of director software 379 is QoSDirector, sold by Sitara Networks, 52 Second Avenue Suite 200, Waltham, Mass. 02451, USA. A commercially available example of a computing platform to run QoSDirector is a 450 MHz SunUltra workstation. A commercially available example of operating system 371 is Solaris Operating System v2.7.

Defining QoS Policy

A network QoS policy can set upper and lower bounds on service to network traffic on a link. For instance, in times of link congestion, a QoS policy indicates types of traffic that should receive prioritized service, including guaranteed lower bounds. Upper bounds can constrain a type of traffic to prevent it from overwhelming other types of traffic, given finite link capacity, for example.

Additionally, QoS device 32 can shape the data rates of individual network flows by queuing flows individually and performing weighted round-robin dequeuing to serve the collection of such queues. The weights of each queue depend on priority of the associated network flow.

CBQ Link Classification Hierarchy

Figure 3A:
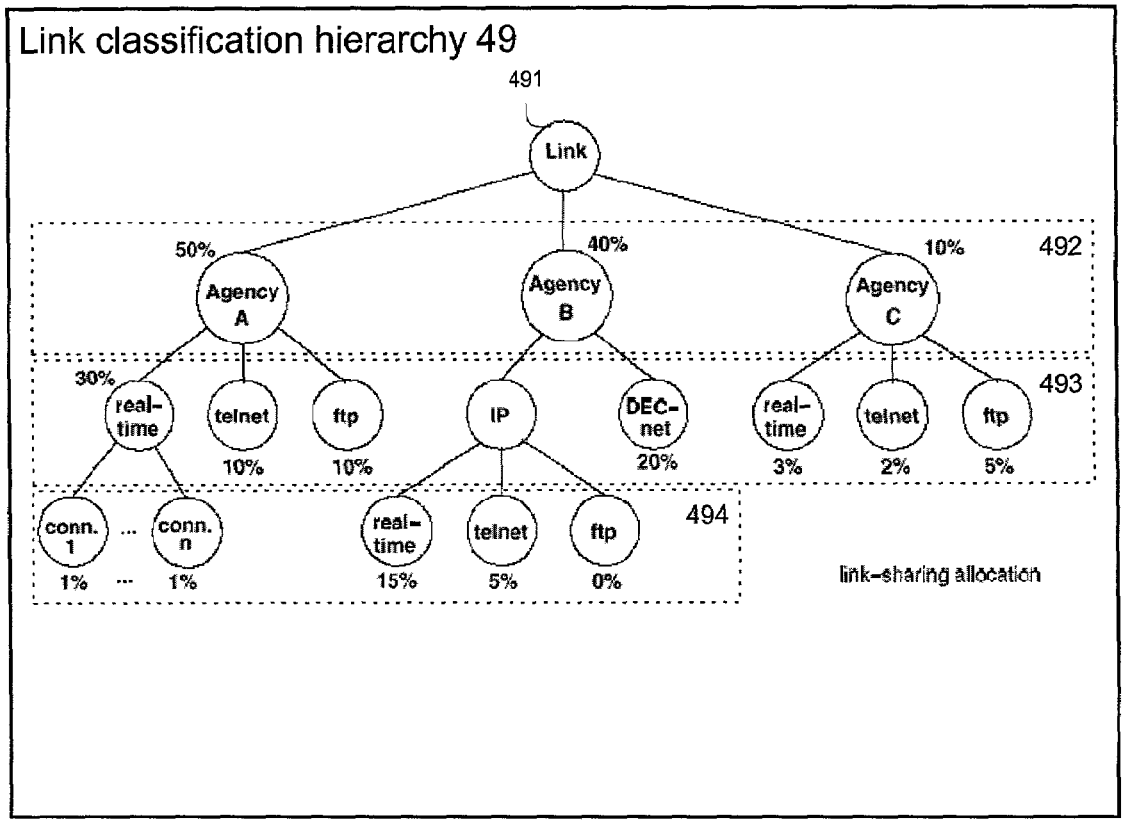
FIG. 3A illustrates a hierarchical link-sharing structure from the prior art.

FIG. 3A shows an example of link classification hierarchy 49. Class-based queuing (CBQ) is an approach to link sharing at a network gateway. CBQ involves a hierarchical decomposition of network link 491 into classes, on which QoS parameters are defined. Classes can be further decomposed into additional classes. Link 491 can be physical or logical.

Hierarchy 49 is represented as a tree, with link 491 at the root. Child nodes represent classes of network traffic that can use bandwidth (usually measured either in bits per second, or as a fraction of the total bandwidth) of the link. A child class derives its allocation of bandwidth from the allocation given to its parent. The allocation can include minimum data rates and maximum data rates. Taken together, the allocation of resources of link 491 among the hierarchy's classes describes a CBQ policy.

Hierarchy 49 defines a classification scheme for traffic that passes over the link, such that every network flow is associated with a node in the hierarchy. A CBQ class includes criteria characterizing the flows that the class will govern. The criteria of a child class are only applied to traffic that qualifies for the criteria of its parent. The set of child classes on a parent class must unambiguously partition the parent's traffic; that is, no flow should qualify for two different children of the same parent. By definition, all traffic qualifies for the link class. A network flow is associated with a node in hierarchy 49 when the flow qualifies for the criteria of the node and does not qualify for the criteria of any child of the node.

The CBQ model articulates at least two goals for link-sharing. One is that each child class that tries to use its allocation should be roughly successful over time. Another goal is that the distribution of surplus bandwidth, i.e. bandwidth left unused after child classes have received their allocated bandwidths, should be planned. The CBQ model allows for a variety of guidelines for putting link classification hierarchy 49 into practice. Most allow a form of borrowing so that an "overlimit" class (one that has demand in excess of its allocated bandwidth) can temporarily use bandwidth reserved for, but not used by, another class. Generally, CBQ guidelines define thresholds for borrowing; when a class cannot borrow enough bandwidth to satisfy its demand within the guidelines, the class becomes regulated by the link-sharing mechanism.

Various algorithms exist for measuring real-time network traffic against the CBQ policy. In general, for a given parent node and its child classes, the aggregate resources consumed by the child classes should not exceed for prolonged periods the resources allocated to the parent. In practice, algorithms can allow limited amounts of such over-consumption, within bounds on duration and on the degree of bandwidth overuse. The exact duration and degree considered permissible depends on several factors, including the individual CBQ policy. For instance, a policy that allocates a high proportion of the total link bandwidth to servicing minimum-bandwidth rates will have less bandwidth available to accommodate transient over-consumption, as compared to a policy with classes that have no minimum-bandwidth requirements.

Percentages next to nodes in FIG. 3A indicate allocations of the total capacity of link 491 at a moment in time. By definition, link 491 has 100% allocation. In the example of FIG. 3A, link 491 has three child nodes 492: one receiving 50% of the bandwidth; one receiving 40%; and one receiving 10%. Each node 492 is subdivided into additional classes. An "interior" node is one with children. A "leaf" node has no children. Leaf nodes may exist for various levels of the hierarchy.

Allocations can be dynamic over time. For example, a node 494 labeled "ftp" is shown in FIG. 3A with a 0% allocation. Flows that qualify for the corresponding class might still be serviced by other scheduling mechanisms, such as one allocating surplus bandwidth, but no service is guaranteed by the CBQ link-sharing mechanism itself.

Policy

Figure 4A:
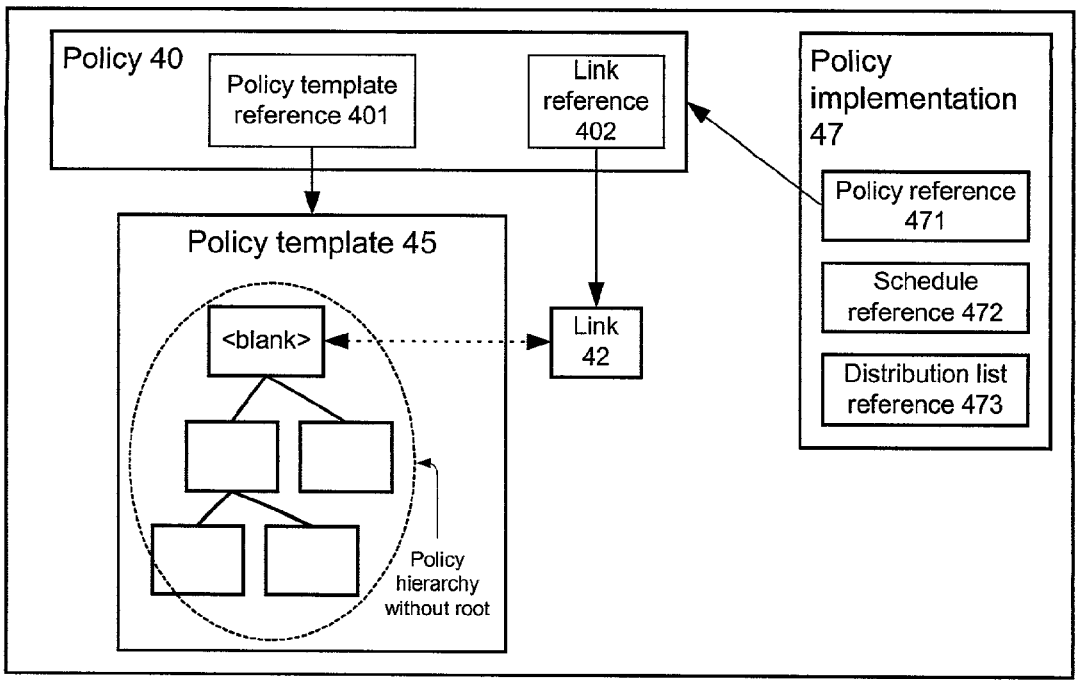
FIG. 4A is a block diagram of a policy, a policy template, and a policy implementation.

Policy 40, shown in FIG. 4A, extends and refines the CBQ model for defining a QoS policy. Similar to CBQ, policy 40 uses a link classification hierarchy, including a root associated with link 42 and classes as nodes in a tree descending from the root. However, policy 40 and other features of this embodiment depart from the CBQ model in at least the following ways, as will be explained in more detail. Policy 40 adds group objects 43 to the hierarchy. Policy 40 captures hierarchy structure below the root as policy template 45 for re-use by other hierarchies. Policy 40 can include more than one link classification hierarchy. Policy 40's classification hierarchy is used both to collect policy statistics on network flows and to collect performance statistics, eliminating discrepancies due to different classification schemes between policy and performance metrics. Policy 40 allows explicit static limits on burst bandwidth, i.e. the amount that one class 44 can borrow from another. (These limits are in addition to the dynamic borrowing limitations that the CBQ allows based on bandwidth available at the moment. Policy 40 allows burst bandwidth to be constrained by both types of limit.) Policy 40 allows administrative parameters to control session bandwidth, admission control, and IP TOS marking. Policy 40 adds schedule 41 to a link classification hierarchy, allowing policy 40 to change based on time of day.

Policy Template

Policy 40 separates link classification hierarchy into a hierarchy structure and a root, allowing a given hierarchy structure to be re-used on other policies 40. Policy template 45 represents the hierarchy structure. As shown in FIG. 4A, policy 40 includes policy template reference 401 to refer to policy template 45. Policy 40 also includes link reference 402 to refer to link 42. Link 42 specified by link reference 402 is associated with the root of the hierarchy for policy 40.

Figure 3B:
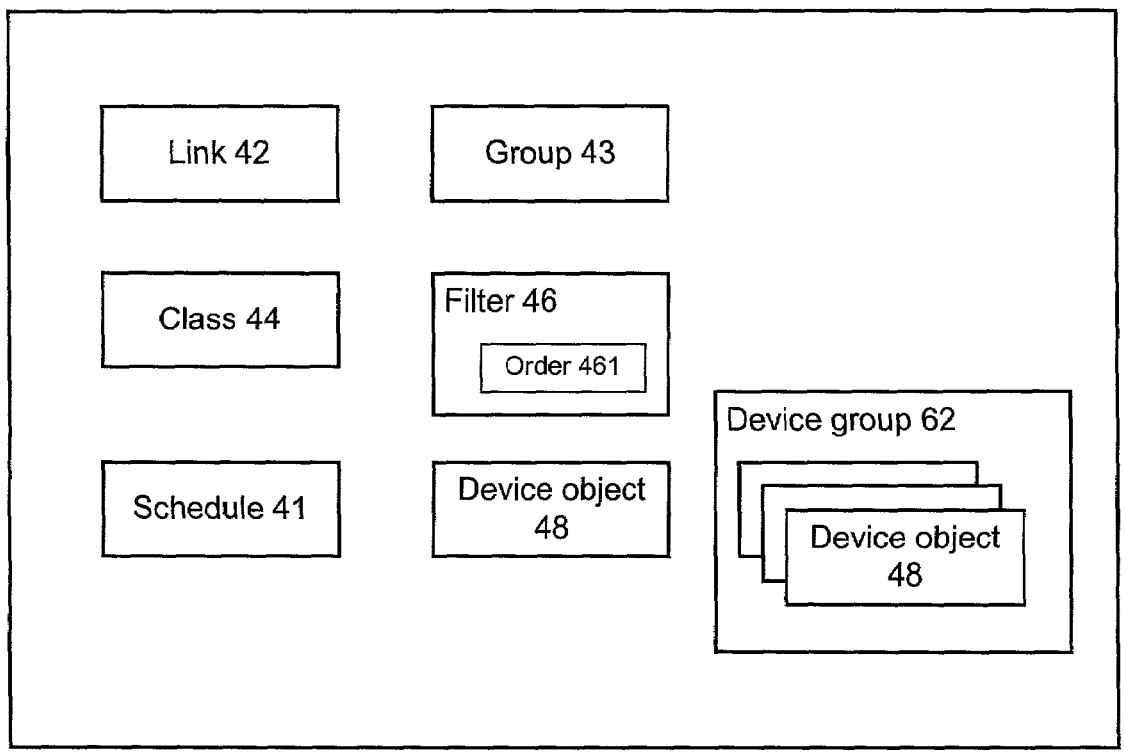
FIG. 3B illustrates software objects for a hierarchical link-sharing structure.
Figure 4B:
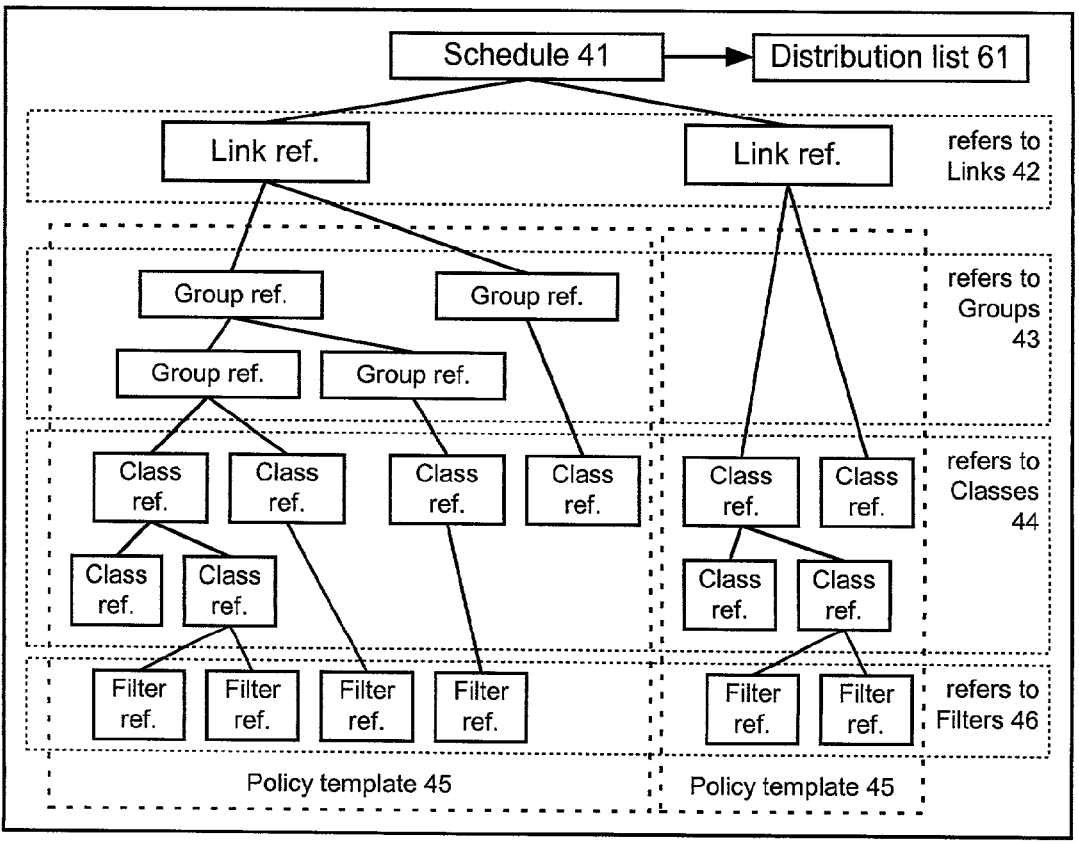
FIG. 4B is a block diagram of a policy.

Each node in policy 40 represents a classification in the link classification hierarchy. Referring to FIG. 4B, nodes for group 43 and class 44 additionally specify allocations of link bandwidth. The child nodes of the hierarchy for policy 40 can reference group 43, class 44, and filter 46, shown in FIG. 3B. Group 43 and filter 46 are optional in a given policy 40. Group 43, class 44, and filter 46 are subject to a precedence ranking in the hierarchy for policy 40 as follows (and as shown in FIG. 4B). Each node for group 43 is a child node of the root or of another group 43. Each node for class 44 is a child node of the root, of group 43, or of another class 44. Each node for filter 46 is a child node of class 44 or group 43.

Conceptually, nodes for groups 43 form a group layer, which is possibly empty. Nodes for classes 44 form a class layer. The group layer is wholly above the class layer in the classification hierarchy for policy template 45. Nodes for filter 46 form a filter layer, which may be empty. The class layer is wholly above the filter layer in the classification hierarchy for policy template 45.

Filter 46 contains filter criteria (described with reference to filter table 506 in FIG. 6) that can identify particular network flows based on IP protocol properties of the network packets. Filter 46 can therefore associate a particular network flow with a particular class 44 or group 43 when configured as a child to the particular class 44 or group 43 in a classification hierarchy.

QoS Device Operation

QoS device 32 passes network traffic from one network segment to another. Broadly speaking, QoS device 32 enforces policies 40, performs optional HTTP caching, and runs agents that oversee policy, performance, and system events.

With regard to FIG. 7A, QoS device logic 35 includes processes for general scheduler 351, link-sharing scheduler 352, classifier 353, estimator 354, enqueuing process 357, HTTP caching process 358, and schedule daemon 59, as will be explained. QoS device logic 35 also includes a collection of network flow queues 355, at least one for each network flow serviced by QoS device 32.

Classifier 353 receives traffic incoming to QoS device 32 and inspects it using the current policy 40. Classifier 353 associates each packet with an entity (group 43, class 44, or filter 46) in policy 40 and further associates the packet with a network flow for that entity. Classifier 353 also collects policy statistics and performance statistics, such as incrementing packet counts. Classifier 353 uses enqueuing process 357 to place the packet on the corresponding network flow queue 355.

Often, some network traffic will not require QoS enforcement, although by processing all network traffic between the segments that it joins, QoS device 32 can ensures that network traffic conforms to policy 40. QoS device 32 uses general scheduler 351 to process network flows by default, while using link-sharing scheduler 352 to process network flows as required by policy 40.

Policy 40 has a timeframe over which to measure bandwidth and other metrics on service. The choice of timeframe depends on several factors in addition to the policy goals, including the network protocols and hardware. In general, too short a timeframe will not adapt to normal statistical fluctuations, while too long a timeframe will not provide the granularity to detect short-term problems. For each entity in policy 40 during an iteration of the timeframe, estimator 354 measures whether the entity is receiving appropriate bandwidth for its allocation.

Queuing

Software bridge 350 can act as a conventional network bridge, i.e. without enforcing any policy 40. This is known as policy off mode. Software bridge 350 can perform in policy off mode during periods when no policy 40 is scheduled to be enforced. Additionally, QoS device 32 is configured to run in policy off mode in case of failure. Software bridge 350 also supports modes for enforcing policy 40.

Software bridge 350 has multiple operational modes, including: policy off mode; LAN to WAN mode; and WAN to LAN mode. LAN to WAN mode and WAN to LAN mode are "policy on" modes, meaning that link-sharing scheduler 352 is actively managing a policy 40. Software bridge 350 can operate in both LAN to WAN mode and WAN to LAN mode simultaneously.

Figure 8A:
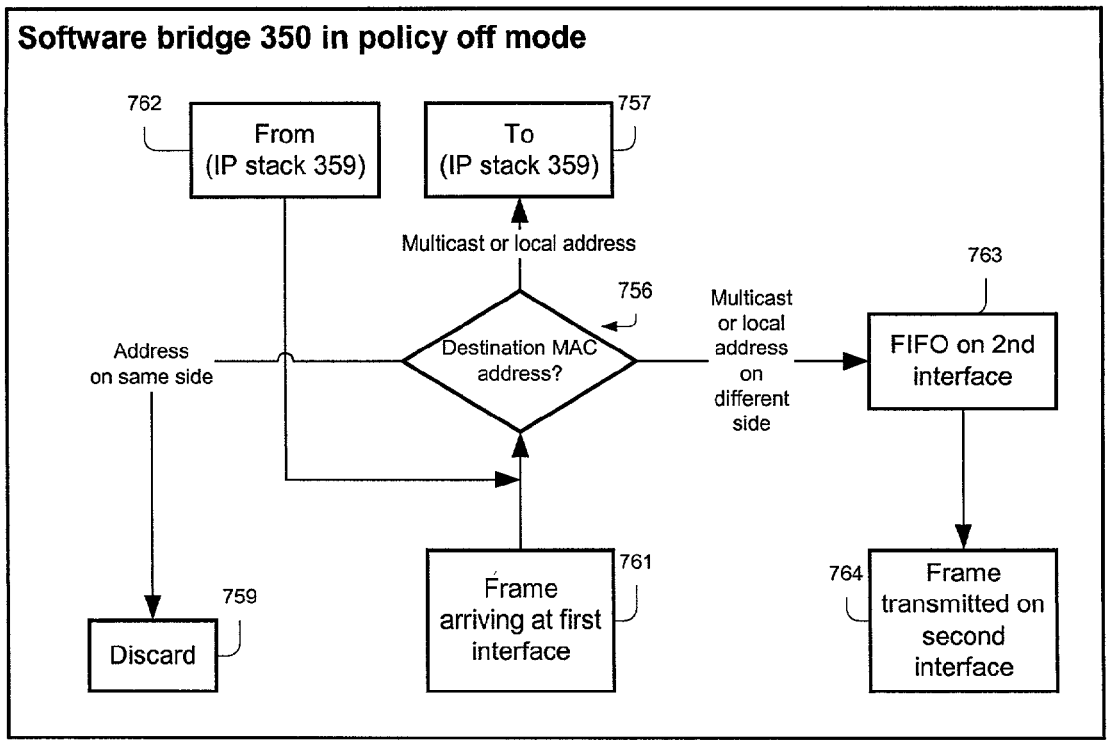
FIG. 8A is a flowchart of a software bridge in policy off mode.

FIG. 8A is a flowchart of software bridge 350 operating in policy off mode, which works as follows. A network frame arrives at either of two interfaces: WAN interface 321 or LAN interface 322 (step 761). In policy off mode, software bridge 350 operates symmetrically on network flows from the LAN and WAN directions. The interface receiving the frame will be called the "first" interface, the other of the two interfaces is the "second". Alternatively, frame can arrive from IP stack 359 (step 762). Software bridge 350 tests the destination MAC address of the frame (step 756). If the MAC address is a multicast or local address, software bridge 350 sends the frame to IP stack 359 for handling (step 757). If the MAC address is on the same segment as the first interface, software bridge 350 discards the frame (step 759). Otherwise, software bridge 350 queues the frame (step 763) for FIFO transmission on the second interface (step 764).

Figure 8B:
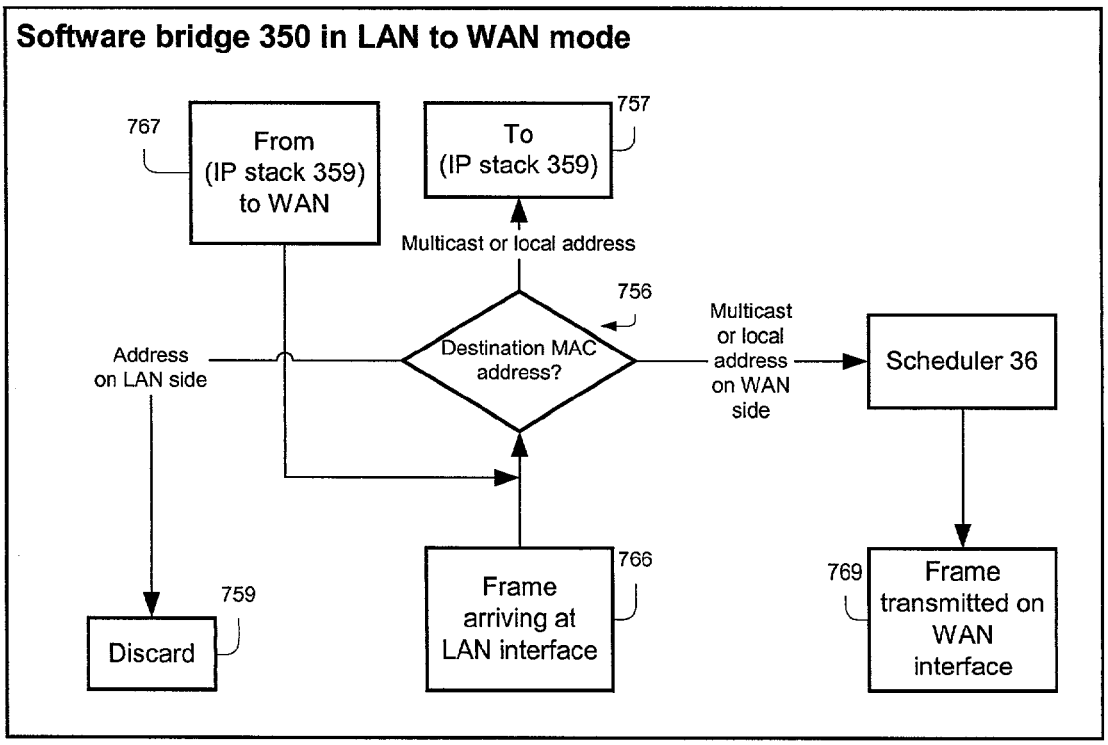
FIG. 8B is a flowchart of a software bridge in LAN to WAN mode.

FIG. 8B is a flowchart of software bridge 350 operating in LAN to WAN mode, as follows. A network frame arrives at LAN interface 322 (step 766). Alternatively, frame can arrive from IP stack 359 bound for WAN 33 (step 767). Software bridge 350 tests the destination MAC address of the frame (step 756). If the MAC address is a multicast or local address, software bridge 350 sends the frame to IP stack 359 for handling (step 757). If the MAC address is on the same segment as LAN interface 322, software bridge 350 discards the frame (step 759). Otherwise, software bridge 350 passes the frame to scheduler 36, which eventually transmits the frame on WAN interface 321 (step 769).

Figure 9A:
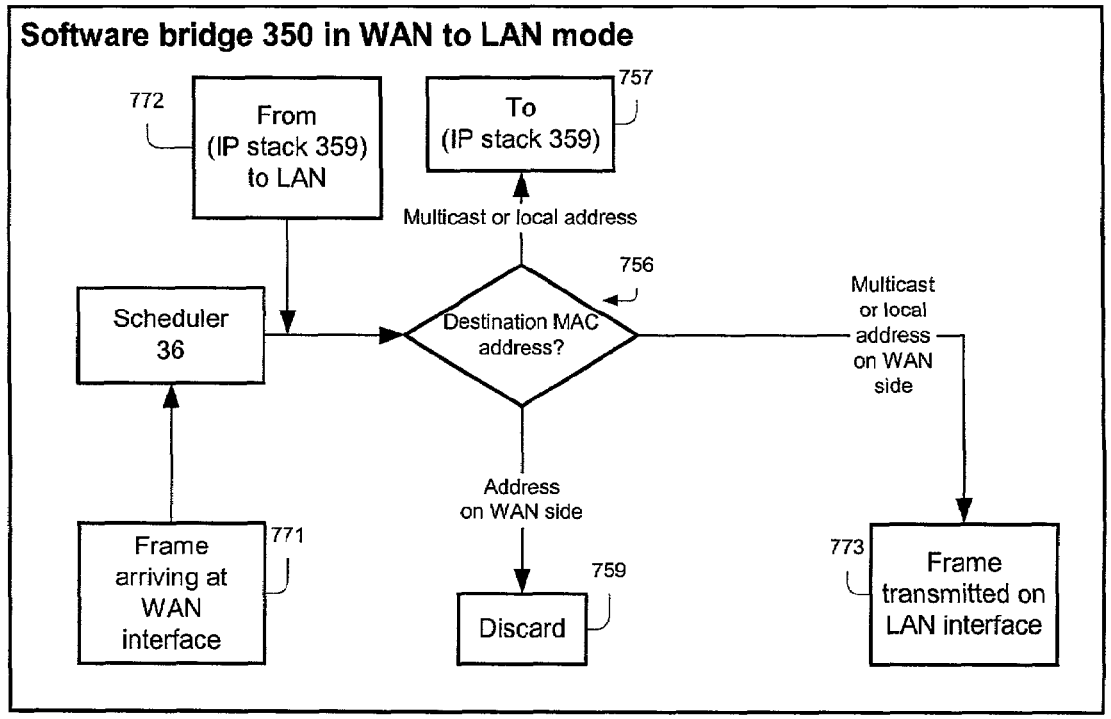
FIG. 9A is a flowchart of a software bridge in WAN to LAN mode.
Figure 9B:
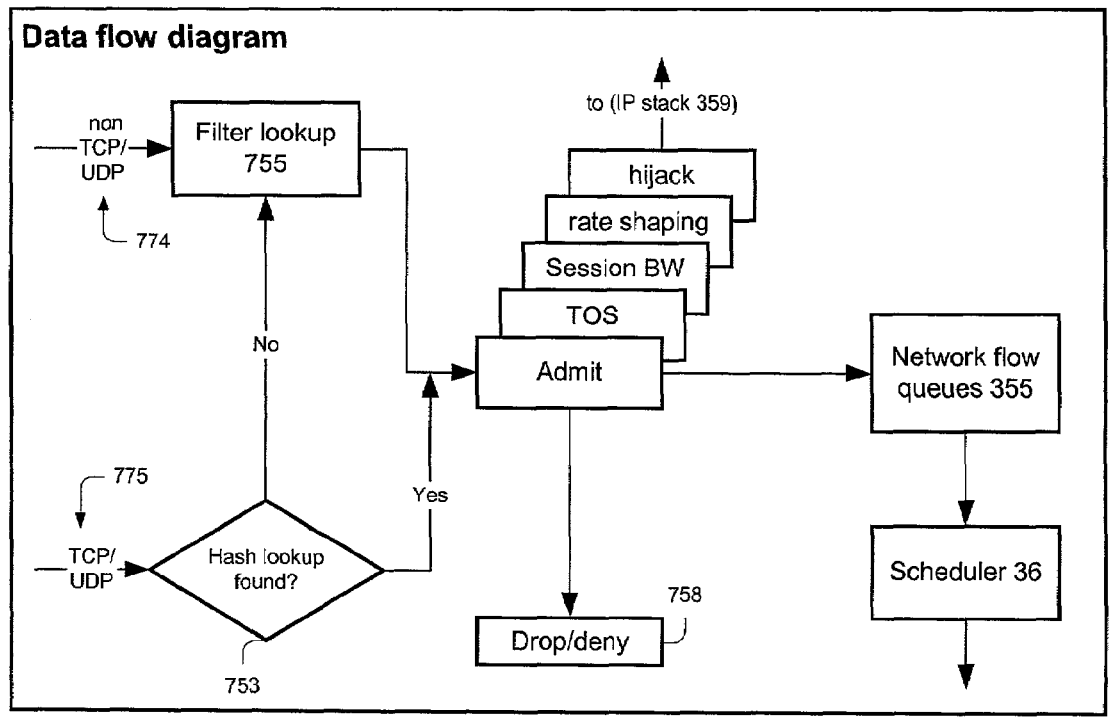
FIG. 9B is a dataflow diagram for handling elements of network flows.

FIG. 9A is a flowchart of software bridge 350 operating in WAN to LAN mode, as follows. A network frame arrives at WAN interface 321 (step 771). Alternatively, a frame can arrive from IP stack 359 bound for LAN 31 (step 772). Software bridge 350 tests the destination MAC address of the frame (step 756). If the MAC address is a multicast or local address, software bridge 350 sends the frame to IP stack 359 for handling (step 757). If the MAC address is on the same segment as WAN interface 321, software bridge 350 discards the frame (step 759). Otherwise, software bridge 350 transmits the frame on LAN interface 322 (step 773).

Inspecttion/Classification

Classifier 353 inspects network packets to associate them with child classes in a link-sharing hierarchy of policy 40. With reference to FIG. 7A, classifier 353 includes filter lookup 755, which compares a network packet with IP parameters stored on filters 46 in policy 40. Filter lookup 755 examines filters 46 according to filter order 461 (shown in FIG. 3B). Filter order 461 is an integer field for this purpose. The execution time of filter lookup 755 is therefore linear with the number of filters 46. Filter lookup 755 is known in the CBQ model.

After filters 46 are generated at director 37 and before distribution to QoS device 32, director 37 ensures that a default filter 46 is present in policy 40.

Classifier 353 also includes hash function 751 that maps IP addresses from the header of the network packet to a hash value. The hash value indexes a location in hash table 752, which stores state information about the network flow associated with the network packet. Given an IP address, hash lookup process 753 can use hash function 751 to find state information about the network flow in constant time, which is fast relative to filter lookup 755.

Policy Enforcement

With reference to FIG. 7A, estimator 354 compares performance statistics on groups 43 and classes 44 to their allocations to determine whether their network flows need to be regulated. Estimator 354 uses top level scheduling, which is a common algorithm in the CBQ model, in this determination. Allocations are defined in terms of a timeframe—for example, packet transmission times, such as can be from speed of link 42 and the bit size of the packet. Estimator 354 makes its comparisons using performance statistics sampled over the same timeframe.

Once estimator 354 designates group 43 or class 44 for regulations, service to the associated network flows are scheduled by link-sharing scheduler 352, until estimator 354 removes this designation. Otherwise, general scheduler 351 services network flows, including any unregulated network flows.

Dequeuing

General scheduler 351 performs weighted round-robin dequeuing of network flows. For network flows within the same classification under policy 40, this dequeuing approach provides a degree of fair service. That is, no one network flow will dominate a given classification. Thus, the behavior of general scheduler 351 is in accordance with one of the link-sharing goals of the CBQ model.

Class 44 can specify a session bandwidth, as will be explained. When a session bandwidth is defined for class 44, general scheduler 351 constrains the dequeuing of each network flow in the classification such that the network flow is serviced at a rate appropriate to the session bandwidth.

Class 44 can also specify an administrative control parameter. The administrative control parameter affects the behavior of general scheduler 351 when the number of network flows for a classification in policy 40 is so great that the classification's bandwidth cannot satisfy all flows (e.g., the number of network flows times the session bandwidth is greater than the bandwidth allocated to class 44). The administrative control parameter specifies an approach for general scheduler 351 to take. The approaches include: "drop", which silently refuses connections to new network flows; "squeezing", which equally divides class 44's allocation of bandwidth among all serviced network flows; and "deny", which (for TCP flows only) responds to the attempted new network flows with an RST packet, as is known in the art.

Class 44 can also specify whether HTTP caching should be enabled for its network flows.

Class 44 can also specify session bandwidth, administrative control, and HTTP caching for each direction of network flows, i.e., LAN-to-WAN and WAN-to-LAN in this embodiment.

Agents

With regard to FIG. 7A, QoS device logic 35 includes policy agent 71, performance agent 72, and system agent 73. Broadly speaking, policy agent 71 monitors policy statistics and maintains them for external access via an SNMP MIB interface. Director 37 and SNMP monitor 39 (shown in FIG. 1A) poll this interface periodically. Policy agent 71 also monitors QoS device 32 for situations requiring out-of-band alerts to director 37 and SNMP monitor 39 and raises these as policy traps.

Performance agent 72 monitors performance statistics for QoS device 32 and maintains them for external access via an SNMP MIB interface. System agent 73 monitors system events for QoS device 32 such as startup, restart, or shutdown.

Director Operation

Figure 10A:
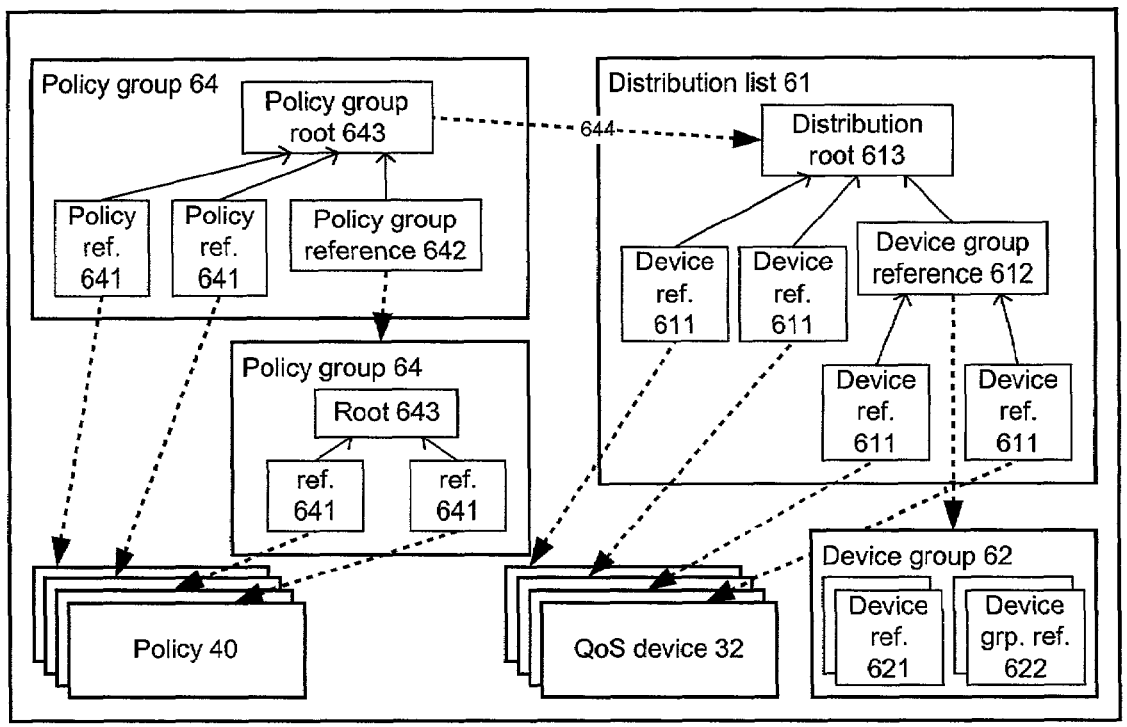
FIG. 10A is a block diagram of a policy group and a distribution list.

Director 37 distributes QoS policies 40 to QoS devices 32. As shown in FIG. 10A, policy group 64 and distribution list 61 enable mappings of grouped policies 40 to grouped QoS devices 32.

Policy group 64 collects one or more policies 40 for distribution by including policy references 641 to them. Policy group 64 can also collect other policy groups 64 via policy group references 644. Conceptually, therefore, policy group 64 forms a tree of policies 40. Policy group 64 includes policy group root 643 to anchor its tree. Policy group 64 also includes distribution list reference 644 to specify distribution list 61.

Similarly, distribution list 61 includes device references 611 for QoS devices 32 that will receive policies 40. Device group 62 includes QoS device reference 621 or device group reference 622 (to other device groups 62) or both. Multiple QoS device references 621 and device group references 622 are allowed. Thus, device group 62 can form a tree of QoS devices 32, and distribution list 61 can form a tree of tree of both QoS devices 32 and device groups 62. Multiple distribution lists 61 can reference a single device group 62.

Reporting

Figure 11A:
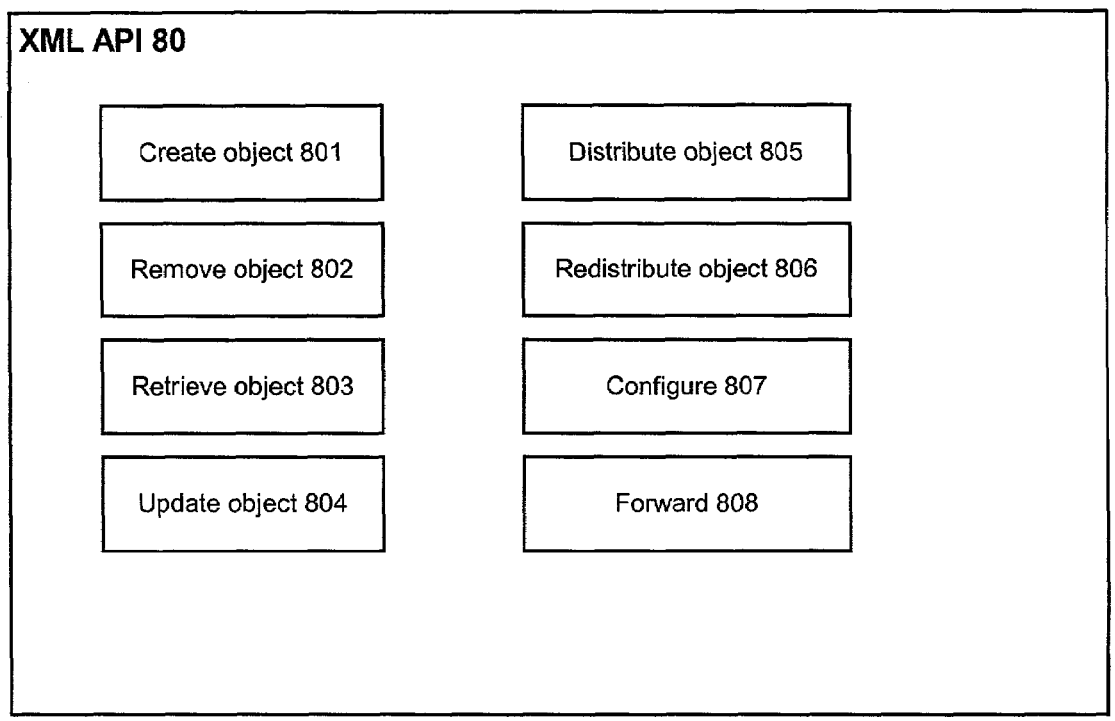
FIG. 11A is a block diagram of XML API features.
Figure 11B:
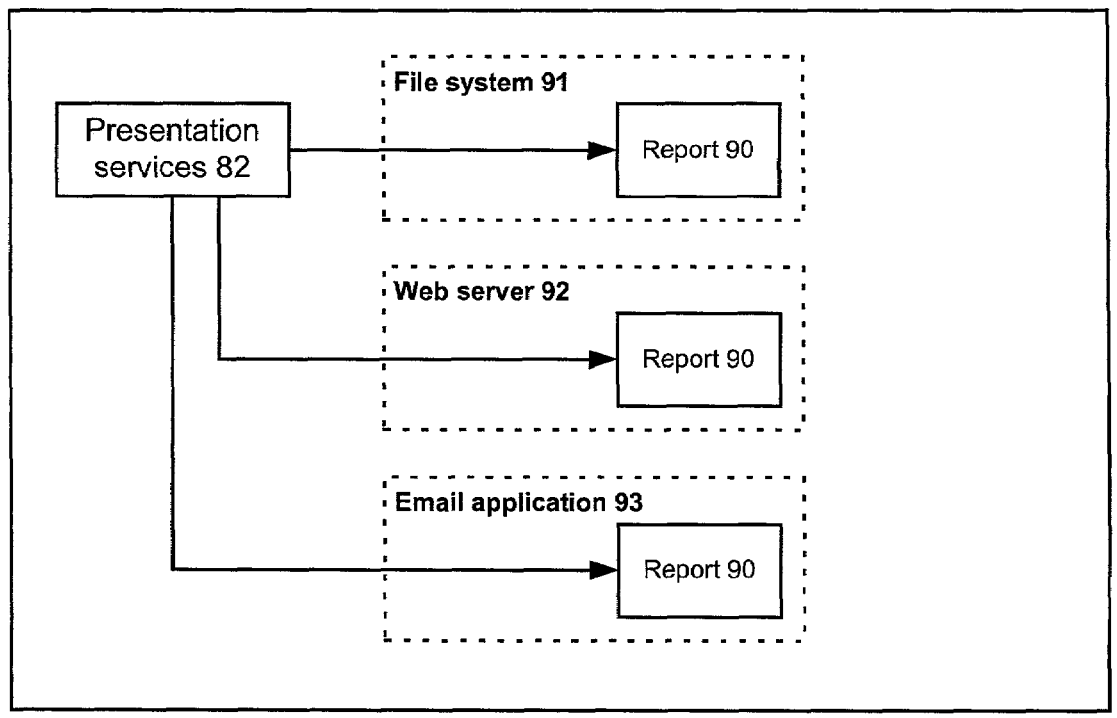
FIG. 11B is a block diagram of report generation.

Director 37 can output reports on an ad-hoc basis or at regular timed intervals. Reports can be output as files charts, tables, or text files in formats such as CSV. As shown in FIG. 11B, presentation services 82 can output report 90 to filing system 91 or to applications such as email application 93 or web server 92. Report 90 includes statistics on network flows, such as packet throughput and bit throughput, classified by network flow as well as by entities in the classification hierarchy of policy 40. Report 90 statistics can also include parameters stored for policy 40, such as bandwidth allocations and textual descriptions of classifications, as well as information on network flows, such as source and destination addresses, protocols, network masks, and the like.

Policy Agent

Policy agent 71 of QoS device 32 exposes MIB interfaces to publish its network traffic statistics. Director 37 (or other compliant SNMP device, such as SNMP monitor 74) polls the MIB interfaces repeatedly to discover the statistics. Policy agent 71 also inspects policy statistics for situations that require notifying director 37 or SNMP monitor 74. Policy agent 71 uses SNMP traps for these notifications, as defined in policy MIB 50 (shown in FIG. 7A). Policy MIB 50 is an interface for policy configuration objects 58.

Policy MIB

Figure 5A:
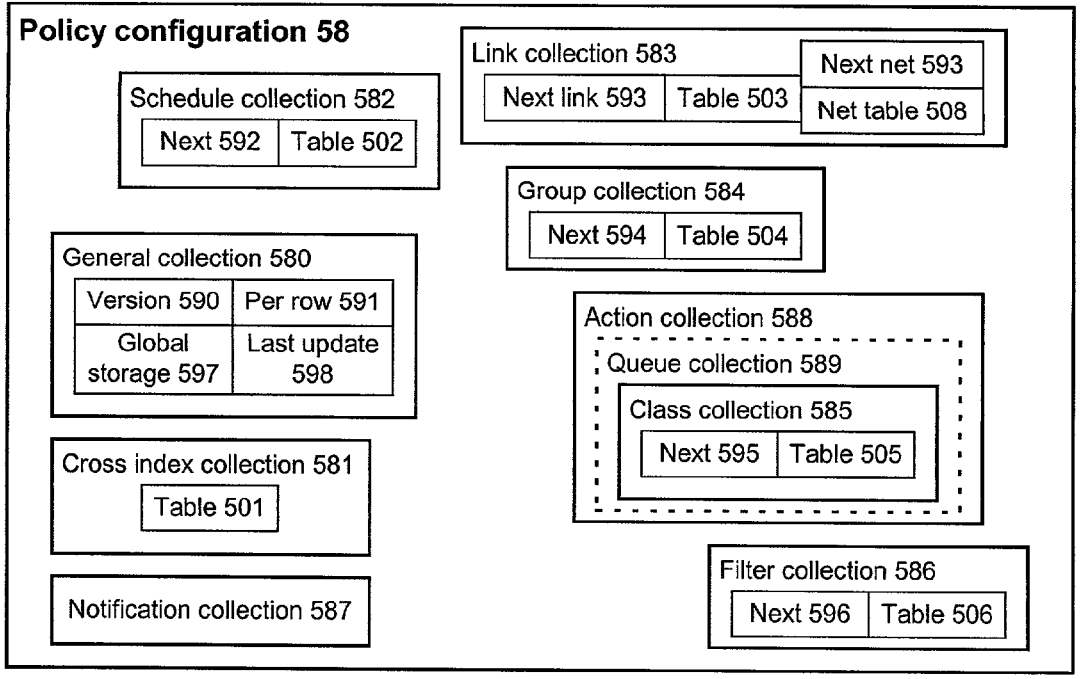
FIG. 5A is a block diagram of a policy configuration.

With regard to FIG. 5A, policy configuration 58 is a top-level MIB object containing references to objects involved in defining policy 40. A MIB reader that accesses policy configuration 58 can use these references to obtain successive additional references to discover the fields specifying policy 40.

Policy configuration 58 includes fields relevant to objects in a link classification hierarchy: schedule collection 582; link collection 583; group collection 584; class collection 585 (albeit indirectly, since policy configuration 58 references action collection 588, which references queue collection 589, which references class collection 585); and filter collection 586. Policy configuration 58 also includes notification collection 587, describing SNMP traps. Policy configuration 58 further includes administrative utilities such as general collection 580 and cross index collection 581.

Schedule collection 582, link collection 583, group collection 584, class collection 585, and filter collection 586 contain references to the following table objects: schedule table 502, link table 503, group table 504, class table 505, and filter table 506, respectively. In addition, these collections contain the following fields that allow a MIB reader to retrieve an index to the next available entry in the respective table: next schedule 592, next link 593, next group 594, next class 595, and next filter 596, respectively.

Link collection 583 also contains a reference to net destination table 508 and a field for next net destination 599.

General collection 580 includes fields for attributes scoped at the top level of policy configuration 58, including version 590, per row update 591, global storage 597, and last update time 598. Version 590 gives the version of QoS device logic 35. Per row update 591 gives the ability to update policy 40 as stored on QoS device 32. Last update time 598 gives the date and time at which policy 40 as stored on QoS device 32 is updated.

Cross index collection 581 gives a virtual directory that allows a MIB reader to query the tree structure.

Notification collection 587 describes policy traps, as will be explained.

Schedule Table

Figure 5B:
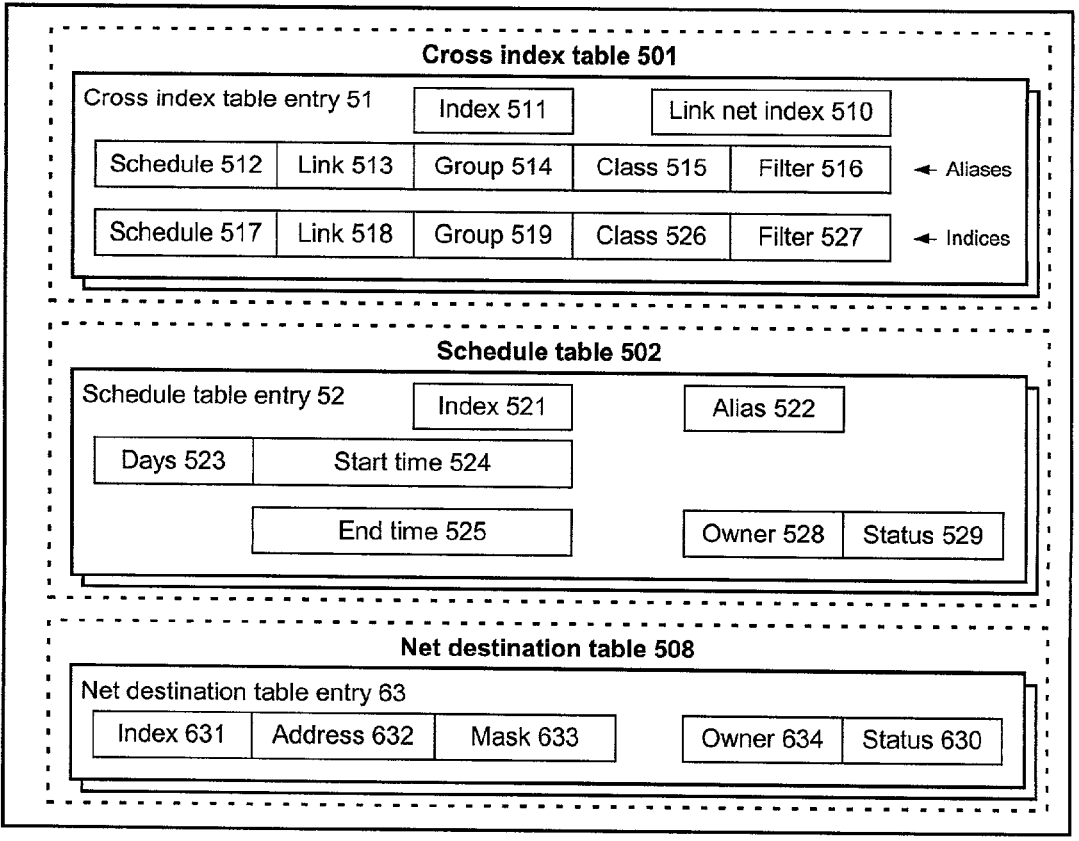
FIG. 5B is a block diagram of tables for cross index, schedule, and net destination.

With reference to FIG. 5B, schedule table 502 includes a sequence of schedule table entries 52. Schedule table entry 52 describes times during which policy 40 should be applied. Schedule table entry 52 includes index 521, alias 522, days of week 523, start time 524, end time 525, owner 528, and status 529. Index 521 is an internal reference number for distinguishing schedule table entries 52, unique within schedule table 502. Alias 522 is also unique within schedule table 502. Alias 522 is a nickname, or name for display to human users. Days of week 523, start time 524, and end time 525 describe time periods in which associated policy 40 should be applied.

Status 529 indicates the current status of schedule table entry 52. Status 529 assumes values defined in SNMPv2-TC. Whenever the value of status 529 goes to active and the object value bit 0x01 is set in per row update 591, policy 40 is updated and CBQD will be restarted.

Schedule daemon 59, shown in FIG. 7A, is software running on QoS device 32 that periodically communicates with director 37 to find and apply updates to data in schedule table is 502.

Link Table and Net Destination Table

Link table 503 provides an interface to objects that expose link entities 42. Link entities 42 can have addresses that have corresponding masks, such as subnet masks. Net destination table 508 provides a way for MIB readers to look up mask data stored for link entities 42.

Figure 6:
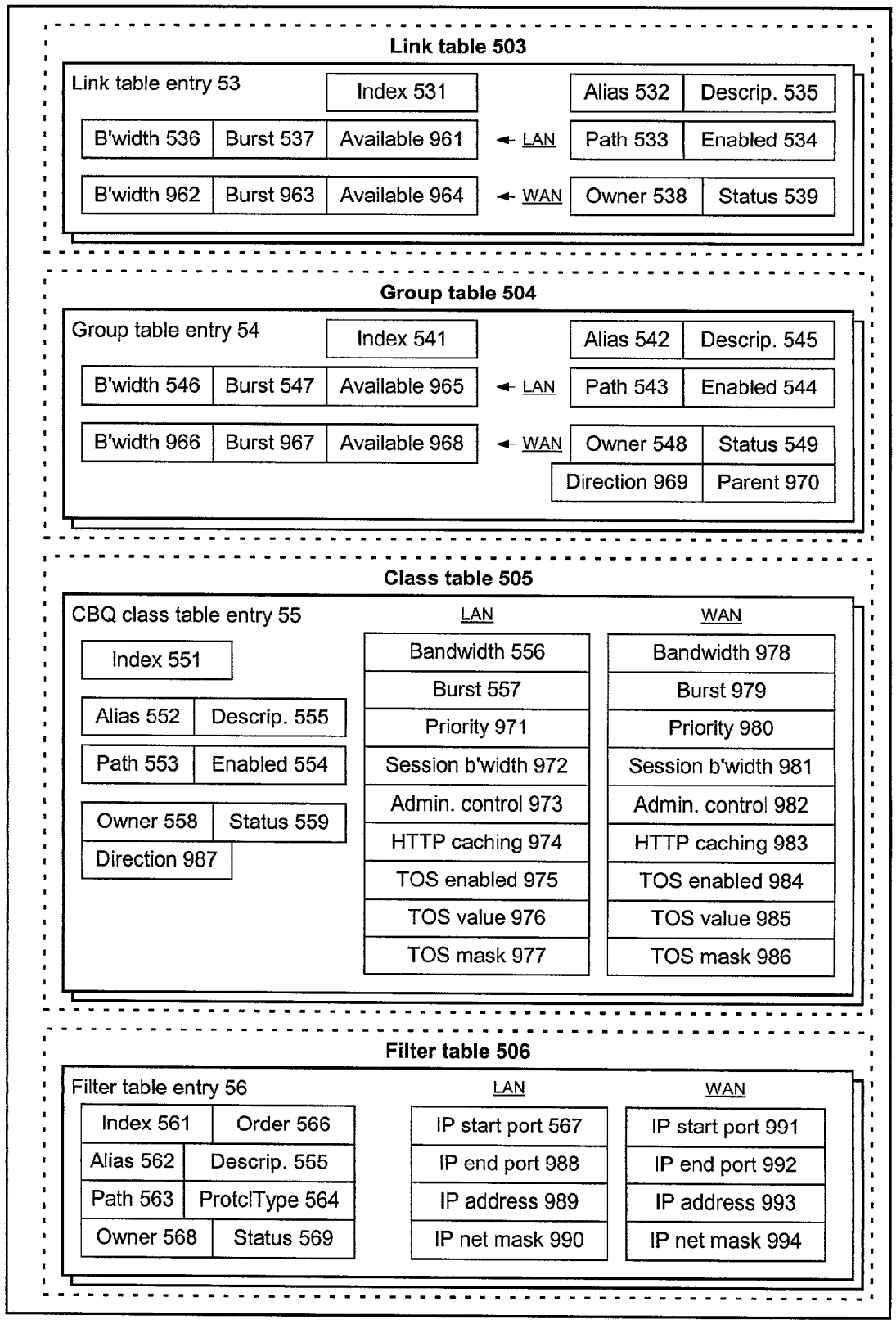
FIG. 6 is a block diagram of tables for link, group, class, and filter.

With reference to FIG. 6, link table 503 includes a sequence of link table entries 53. Link table entry 53 provides an interface to link entities 42. Link table entry 53 includes index 531, alias 532, owner 538, and status 539, whose functions match their counterparts of the same names in schedule table entry 52.

Link table entry 53 also includes fields for path 533, enabled 534, description 535. Path 533 gives a fully qualified name for corresponding link entity 42. Enabled 534 specifies whether link entity 42 is enabled or disabled. Description 535 is a human-readable text description of link entity 42.

Link table entry 53 further includes fields for LAN bandwidth 536, LAN burst 537, and LAN available bandwidth 961, as well as WAN bandwidth 962, WAN burst 963, WAN available bandwidth 964. LAN bandwidth 536 describes the capacity of link entity 42 for network flows departing QoS device 32 on LAN interface 322. LAN burst 537 and LAN available bandwidth 961 also describe burst bandwidth and available bandwidth, respectively, on LAN interface 322. WAN bandwidth 962, WAN burst 963, WAN available bandwidth 964 describe the corresponding parameters for network flows departing QoS device 32 on WAN interface 321.

With reference to FIG. 5B, net destination table 508 includes a sequence of net destination table entries 63, which store address/mask pairs. Net destination table entry 63 includes index 631, owner 634, and status 630, whose functions match their counterparts of the same names in schedule table entry 52. Net destination table 508 also includes address 632 and mask 633, which store IP addresses and masks, respectively.

Group Table

Group table 504 provides an interface that exposes groups 43 to MIB readers.

With reference to FIG. 6, group table 504 includes a sequence of group table entries 54. Group table entry 54 includes index 541, alias 542, path 543, enabled 544, description 545, LAN bandwidth 546, LAN burst 547, LAN available bandwidth 966, WAN bandwidth 966, WAN burst 967, WAN available bandwidth 968, owner 548, and status 549, whose functions match their counterparts of the same names in link table entry 53, except that they apply to a corresponding group 43 rather than link entity 42. Bandwidth fields describe allocations given to the corresponding group 43 by policy 40.

Group table entry 54 also includes direction 969 and parent index 970. Direction 969 specifies a direction for network traffic flow: departing QoS device 32 on LAN interface 322; departing QoS device 32 on WAN interface 321; or both, i.e., bidirectional traffic.

Class Table

Class table 505 provides an interface that exposes classes 44 to MIB readers.

With reference to FIG. 6, class table 505 includes a sequence of class table entries 55. Class table entry 55 includes index 551, alias 552, path 553, enabled 554, description 555, LAN bandwidth 556, LAN burst 557, WAN bandwidth 978, WAN burst 979, direction 987, owner 558, and status 559, whose functions match their counterparts of the same names in group table entry 54, except that they apply to a corresponding class 44 rather than group 43.

For network flows associated with the corresponding class 44 in the WAN-to-LAN direction, class table entry 55 also includes LAN priority 971, LAN session bandwidth 972, LAN administrative control 973, and LAN HTTP caching 974. LAN priority 971 specifies a priority. LAN session bandwidth 972, LAN administrative control 973, and LAN HTTP caching 974 are parameters used by general scheduler 351 for similar traffic. Class table entry 55 further includes LAN TOS enabled 975, LAN TOS value 976, and LAN TOS mask 977. Certain network applications and protocols can set bits in the TOS (type of service) field in the header of IPv2 packets. These bits are not used by the IP protocol per se and thus would otherwise not be inspected. LAN TOS enabled 975 instructs the classification for associated class 44 whether to consider TOS bits. LAN TOS value 976 and LAN TOS mask 977 specify a particular bit value and a bit mask to use.

Class table entry 55 also includes WAN bandwidth 978, WAN burst 979, WAN priority 980, WAN session bandwidth 981, WAN administrative control 982, WAN HTTP caching 983, WAN TOS enabled 984, WAN TOS value 985, and WAN TOS mask 986, whose functions on network flows in the LAN-to-WAN direction match their counterpart fields having "LAN" prefixes.

Filter Table

Filter table 506 provides an interface that exposes filters 46 to MIB readers.

With reference to FIG. 6, filter table 506 includes a sequence of filter table entries 56. Filter table entry 56 includes index 561, alias 562, path 563, description 565, owner 568, and status 569, whose functions match their counterparts of the same names in link table entry 53.

Filter table entry 56 also includes protocol type 564 and order 566. Protocol type 564 specifies a value to match against values in the protocol field of IP headers in network flows affected by filter 46. Order 566 affects the order in which related filter 46 should be applied, relative to other filters 46 in policy 40.

Filter table entry 56 further includes LAN IP start port 567, LAN IP end port 988, LAN IP address 989, and LAN IP net mask 990, which characterize parameters on IP traffic for network flows associated with the corresponding filter 46 in the WAN-to-LAN direction. Filter table 506 also includes WAN IP start port 991, WAN IP end port 992, WAN IP address 993, and WAN IP net mask 994, whose functions on network flows in the LAN-to-WAN direction match their counterpart fields having "LAN" prefixes.

Cross Index Table

Cross index table 501 gives a virtual directory that allows a MIB reader to query the tree structure.

With reference to FIG. 5B, cross index table 501 includes a sequence of cross index table entries 51. Cross index table entry 51 includes index 511, whose functions match those of its counterpart of the same name in link table entry 53.

Cross index table entry 51 also includes schedule alias 512, link alias 513, group alias 514, class alias 515, and filter alias 516, as well as corresponding fields schedule index 517, link index 518, group index 519, class index 526, and filter index 527, respectively. Furthermore, cross index table entry 51 includes link net index 510 corresponding to link alias 513. That is, link alias 513 corresponds to both link index 518 and link net index 510.

Cross index table 501 can be used as a virtual directory by an SNMP application, as follows. Using standard SNMP techniques, the application can set a value in cross index table entry 51, for instance group alias 514. Setting the value represents a query for the indices of tables corresponding to that value. After detecting the set value, cross index table 501 is populated with a sequence of cross index table entries 51 sufficient to describe the matching table entries. The tables available for querying include: schedule table 502 via schedule alias 512 and schedule index 517; link table 503 via link alias 513, link index 518, and link net index 510; group table 504 via group alias 514 and group index 519; class table 505 via class alias 515 and class index 526; and filter table 506 via filter alias 516 and filter index 527.

Central Policy Manager API

Figure 10B:
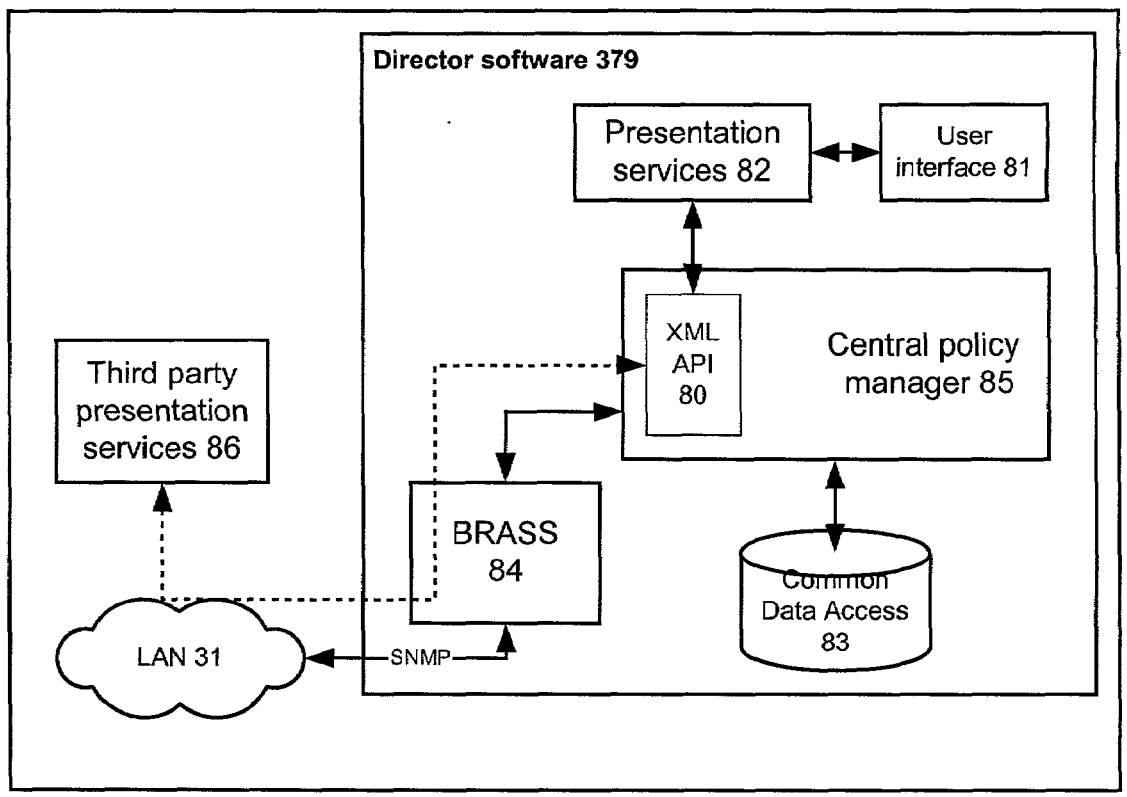
FIG. 10B is a block diagram of a director device with XML API.

With regard to FIG. 10B, director software 379 includes graphical user interface (GUI) 81, presentation services 82, common data access 83, BRASS 84, and central policy manager 85. GUI 81 presents an interactive user interface to human users of the software. Presentation services 82 responds to human interaction with GUI 81 and contains logic governing the use of policy management objects by director software 379. Central policy manager 85 acts as a central collection point for interactions with policy objects; multiple presentation services 82 module across a LAN 31 or WAN 33 can draw from a single central policy manager 85.

Common data access 83 provides persistent storage of policy objects, with a common API independent of the storage mechanism selected. Common data access 83 can store objects in a filing system or in a relational database. Common data access 83 stores objects including schedule 41, link entity 42, group 43, class 44, and filter 46. These objects correspond to data furnished to schedule table 502, link table 503, group table 504, class table 505, and filter table 506, respectively. Common data access 83 also stores policy template 45.

BRASS 84 provides SNMP network services over LAN 31 and to any connected network. BRASS is a commercial product sold by SNMP Research International, 3001 Kimberlin Heights Road, Knoxville, Tenn., USA.

Central policy manager 85 includes XML API 80 to expose policy objects for manipulation by presentation services 82. XML API 80 uses the XML information protocol. Information in XML API 80 uses a structured format corresponding to data elements of policy configuration 58, including schedule table 502, link table 503, group table 504, class table 505, filter table 506, and net destination table 508. An example XML document for use with XML API is given in Appendix A.

Third party presentation services 86 can also use XML API 80. In general, authorized third party presentation services 86 need only to know the XML structure of documents and their roles in order to use open network standards and XML to use XML API 80. Thus, third-party applications can manage policies 40 on QoS devices 32 by using XML API 80.

With regard to FIG. 11A, XML API 80 exposes features including: create object 801, for creating policy objects; remove object 802, retrieve object 803, and update object 804, for removing, retrieving, and updating specified policy objects, respectively; distribute object 805, for distributing an object to a specified QoS device 32, as well as redistribute object 806 for distributing objects that have been instantiated on QoS device 32 already but have been subsequently modified on director 37; configure 807, for configuring the filtering and processing of incoming event notifications; and forward 808, for forwarding event, status, and error information from central policy manager 85 back to GUI 81.

Alternate Embodiments

A number of embodiments of the invention have been described. Nevertheless, it will be understood that various modifications may be made without departing from the spirit and scope of the invention. For example, QoS device 32 and router 313 have been described as separate devices, but their functions could be incorporated on one device. Moreover, additional network devices such as firewalls, proxy servers, etc., can be present in LAN edge 317 and can even be merged with QoS device 32 or router 313 or both.

In another embodiment, QoS device 32, router 313, local QoS-router link 312, and other elements of LAN edge 317 can be implemented with redundant or parallel systems. That is, QoS device 32, router 313, local QoS-router link 312, and other elements of LAN edge 317 can be logical subsystems with multiple physical components. The multiple physical components can exist for failsafe redundancy, parallel processing, or both, among other purposes. Additionally, edge link 314 can be a logical network link comprising multiple physical network links. Traffic across the multiple physical network links can be multiplexed, or edge link 314 can be the simple aggregate trunk of the multiple physical network links.

QoS device 32 need not be located at LAN edge 317 but can be inserted into any network link to manage the traffic across that link.

Director 37 can manage one QoS device 32 without managing a remote QoS device 345. Similarly, director 37 can manage remote QoS device 345 without managing a QoS device 32.

WAN interface 321 and LAN interface 322 can be non-Ethernet network interfaces, such as fiber optic. WAN interface 321 and LAN interface 322 can support speeds higher than 10/100 Mbps, such as Gigabit Ethernet or higher speeds known in the art.

Frame relay network 305 could be any packet data network.

Accordingly, other embodiments are within the scope of the following claims.

What is claimed is:

1. A machine-based method for network quality-of-service policies, comprising:
providing a network quality-of-service policy defined using a multi-layer classification hierarchy for network flows on a link, the classification hierarchy comprising a root for the link, a group layer containing a plurality of groups, a class layer containing a plurality of classes, and a filter layer containing a plurality of filters;
detecting a violation at the group layer, the filter layer, or both of the classification hierarchy of the quality-of-service policy on a network; and
sending a notice of the violation to a network management station.

2. The method of claim 1, wherein the sending notice uses an open network standard.

3. The method of claim 2, wherein the sending notice uses SNMP.

4. The method of claim 1, wherein the detecting is performed by a policy agent running as a software process on a quality of service device on the network.

5. The method of claim 1, wherein the group layer lies wholly above the class layer in the classification hierarchy and the filter layer lies wholly below the class layer.

6. The method of claim 1, wherein the group layer comprises an empty set.

7. The method of claim 1, wherein a group in the plurality of groups can contain child groups or child classes or both, and a class in the plurality of classes can contain child classes, each child group or child class having a parent in the classification hierarchy representing both a sub-classification of network flows defined on the parent and an allocation of link resources from the parent to the child.

8. The method of claim 1, wherein the sending comprises: sending a notification for each of the detected violations.

9. The method of clams 1, wherein the classification hierarchy further comprises a hierarchy structure below the root, and the method further comprises:
generating a policy template defined using the hierarchy structure below the root.

10. The method of claim 1, further comprising detecting a violation at the class layer of the classification hierarchy of the quality-of-service policy en the network.

11. The method of claim 1, wherein the network quality-of-service policy constrains burst bandwidth using both static limits and dynamic limits.

* * * * *